United States Patent [19]

Grollimund

[11] Patent Number: 4,529,040

[45] Date of Patent: Jul. 16, 1985

[54] FOLDING AGRICULTURAL IMPLEMENT WITH STRUCTURE FOR LOCKING TOOL BAR SECTIONS

[76] Inventor: David J. Grollimund, R.R. #4, Box 153, Pendleton, Ind. 46064

[21] Appl. No.: 558,550

[22] Filed: Dec. 5, 1983

Related U.S. Application Data

[63] Continuation of Ser. No. 297,040, Aug. 27, 1981, abandoned.

[51] Int. Cl.³ .............................................. A01B 73/00
[52] U.S. Cl. ................................... 172/311; 172/126; 172/456; 172/466; 111/57
[58] Field of Search .............. 172/311, 456, 458, 479, 172/777, 466, 126, 130; 111/56, 57, 58

[56] References Cited

U.S. PATENT DOCUMENTS

| | | | |
|---|---|---|---|
| 3,208,536 | 9/1965 | Orendorff | 172/456 |
| 3,498,387 | 3/1970 | Roth | 172/311 X |
| 3,814,191 | 6/1974 | Tilbury | 172/311 |
| 4,011,914 | 3/1977 | Elmer | 172/126 |
| 4,049,062 | 9/1977 | Rossmiller et al. | 172/126 |
| 4,171,726 | 10/1979 | Ward | 172/456 |
| 4,172,537 | 10/1979 | Gandrud et al. | 172/311 |
| 4,366,867 | 1/1983 | Filbrun | 172/311 X |

FOREIGN PATENT DOCUMENTS

| | | | |
|---|---|---|---|
| 2455660 | 7/1975 | Fed. Rep. of Germany | 111/57 |
| 2406702 | 8/1975 | Fed. Rep. of Germany | 111/57 |
| 2414098 | 10/1975 | Fed. Rep. of Germany | 111/57 |
| 2818359 | 11/1979 | Fed. Rep. of Germany | 172/612 |

Primary Examiner—Richard T. Stouffer
Attorney, Agent, or Firm—Barnes & Thornburg

[57] ABSTRACT

In an agricultural implement which includes a tool bar, a tongue for towing the implement in a direction generally transverse to the direction in which the tool bar extends, and a plurality of operating heads mounted from the tool bar for performing a function, such as planting, the tool bar is divided into sections of convenient length which are hinged to fold from their generally colinear use orientations to generally parallel or at relatively small angles to each other. This compact folded implement is much more conveniently transported, for example, between agricultural fields on public highways.

5 Claims, 10 Drawing Figures

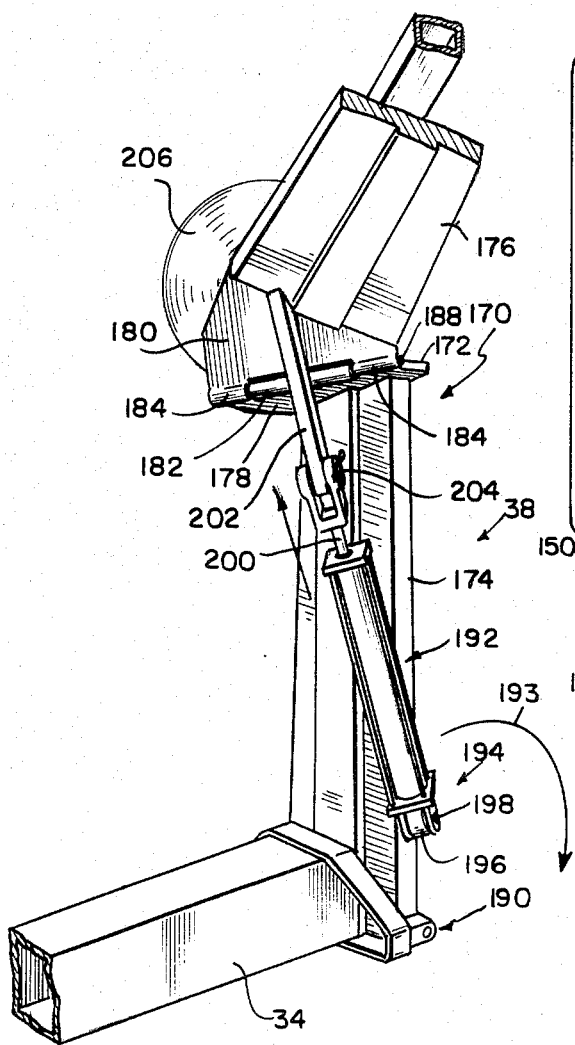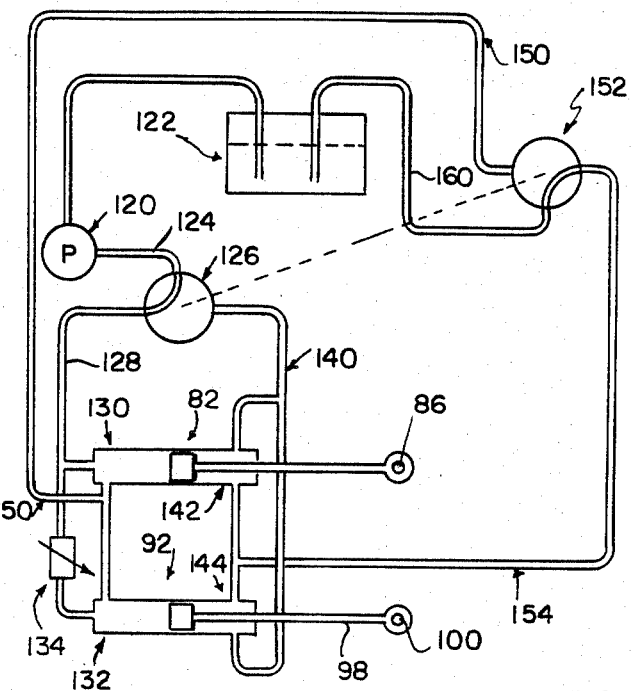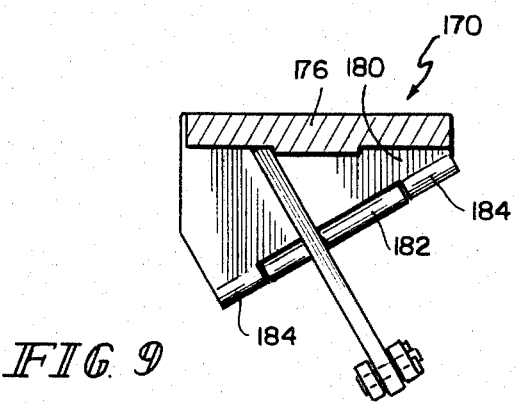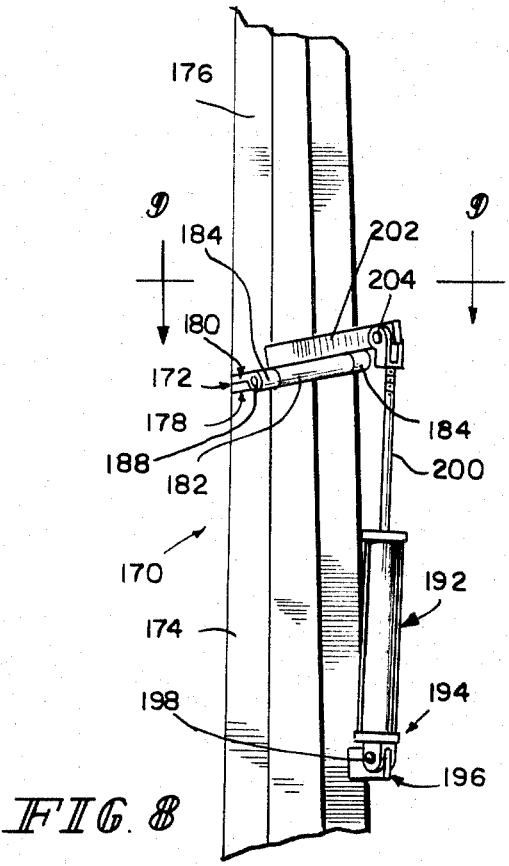

FOLDING AGRICULTURAL IMPLEMENT WITH STRUCTURE FOR LOCKING TOOL BAR SECTIONS

This application is a continuation of copending application Ser. No. 297,040, filed Aug. 27, 1981, now abandoned.

This invention relates to agricultural implements, and more specifically, to those implements such as planters which are conventionally quite wide to enable planting of several rows simultaneously. Such implements, while they offer time- and fuel-saving advantages during planting, are quite cumbersome and unwieldy to transport, e.g., tow behind a tractor vehicle, between agricultural fields on public ways.

Folding agricultural implements, such as twelve- or sixteen-row planters are known. See, for example, *Drawn and Integral Planters*, John Deere Pamphlet A-15-78-11. Folding planters disclosed in that publication include the Model 7100 planter in which the end sections of the planter tool bar are hinged to fold vertically above the center section of the tool bar. This folding arrangement is frequently inconvenient, for example, where height restrictions prohibit such tall folded structures. This publication also discloses the Model 7000 front-folding planter in which the tool bar is divided into sections which fold forward horizontally from a center carrier. A significant disadvantage of this type of arrangement is the long tongue or hitch which many farmers find cumbersome in transportation.

One "forward and up" folding design includes hinges mounted on the front of the tool bar (hitch side) with hinge axes canted at approximately 2° from vertical in a plane parallel to the longitudinal extent of the tool bar when unfolded. This 2° angle results in the end sections of the tool bar folding forward and 4° above the center line of the center section of the tool bar. This is barely enough upward folding to permit the ends of the end sections of the tool bar to clear the tongue or hitch. In fact, the marker ends of the end sections of the tool bar rest upon the hitch when folded. A disadvantage of this type system is that sufficient space must be left on the hitch between the marker ends of the two folding end sections to provide clearance for the markers. In a standard twelve-row planter, this arrangement permits the planter to fold to a width of approximately 16 feet, 8 inches (5.08 meters). This is a somewhat inconvenient width, in that it is too wide for convenient transport on public roadways.

According to the invention, an improved "forward and up" fold configuration for wide agricultural implements, such as planters, is provided. According to the invention, in a conventional planter, such as a twelve-row corn or soybean planter, folded widths of approximately 14 feet, 8 inches (about 4.47 meters) can readily be achieved. Such widths are much more readily transportable on public roadways than other "forward and up" folded configurations which are wider.

According to the invention, an agricultural implement includes a tool bar and a tongue or hitch, means for mounting the hitch from the tool bar to tow the implement, with the tool bar extending generally transverse to the direction in which the implement is towed, one or more operating heads, and means for mounting the operating heads from the tool bar in functional positions. The tool bar includes a first, or center, tool bar section and a second, or end, tool bar section, and means for movably connecting the first and second tool bar sections so that they are movable into a use orientation in which they extend generally colinearly generally transverse to the direction in which the tool bar is towed, and into a non-use orientation in which the implement can conveniently be towed. The means for connecting the first and second sections together includes a hinge which extends generally from adjacent the vertically upper extent of the tool bar to adjacent the vertically lower extent of the tool bar and includes a hinge axis which is angled from the vertical in a plane parallel to the longitudinal extent of the tool bar so that the end of the second section, when in non-use orientation, is vertically higher than the adjacent portion of the first section. The angle the hinge axis makes with the vertical in the plane parallel to the longitudinal extent of the tool bar is between about 5° and about 15°.

In summary, in a so-called "forward and up" folding agricultural implement, the hinge axis of the hinge connecting first and second tool bar sections makes an angle with the vertical in a plane parallel to the longitudinal extent of the tool bar between about 5° and about 15°.

According to another aspect of the invention, an agricultural implement includes a tool bar and a tongue, means for mounting the tongue from the tool bar to tow the implement with the tool bar extending generally transverse to the direction in which it is towed, one or more operating heads, and means for mounting the operating heads from the tool bar in functional positions. The tool bar includes a first section and a second section, and means for movably connecting the first and second tool bar sections so that they are movable into a use orientation in which they extend generally colinearly, generally transverse to the direction in which the tool bar is towed, and into a non-use orientation in which the implement can conveniently be towed. The means for connecting the first and second sections together includes a hinge which extends generally from the vertically upper extent of the tool bar to the vertically lower extent of the tool bar and provides an axis which is angled from the vertical in a plane perpendicular to the longitudinal extent of the tool bar. This aids in movement of the second section from the non-use orientation to the use orientation.

Illustratively, the angle the hinge makes with the vertical in the plane perpendicular to the longitudinal extent of the tool bar is greater than 0° and less than about 10°. In the illustrated embodiment, the angle is about 4°.

The invention may best be understood by referring to the following description and accompanying drawings which illustrate the invention. In the drawings;

FIG. 7 is a perspective view of a folded marker boom illustrated in FIGS. 1–2;

FIG. 8 is a fragmentary elevational view of a portion of the unfolded or extended marker boom;

FIG. 9 is a sectional view of the marker boom of FIGS. 7 and 8, taken generally along section lines 9—9 of FIG. 8; and FIG. 10 is a highly diagrammatic view of a portion of a hydraulic circuit useful with the hydraulic cylinders illustrated in the details of FIGS. 3–6.

Figure 1:
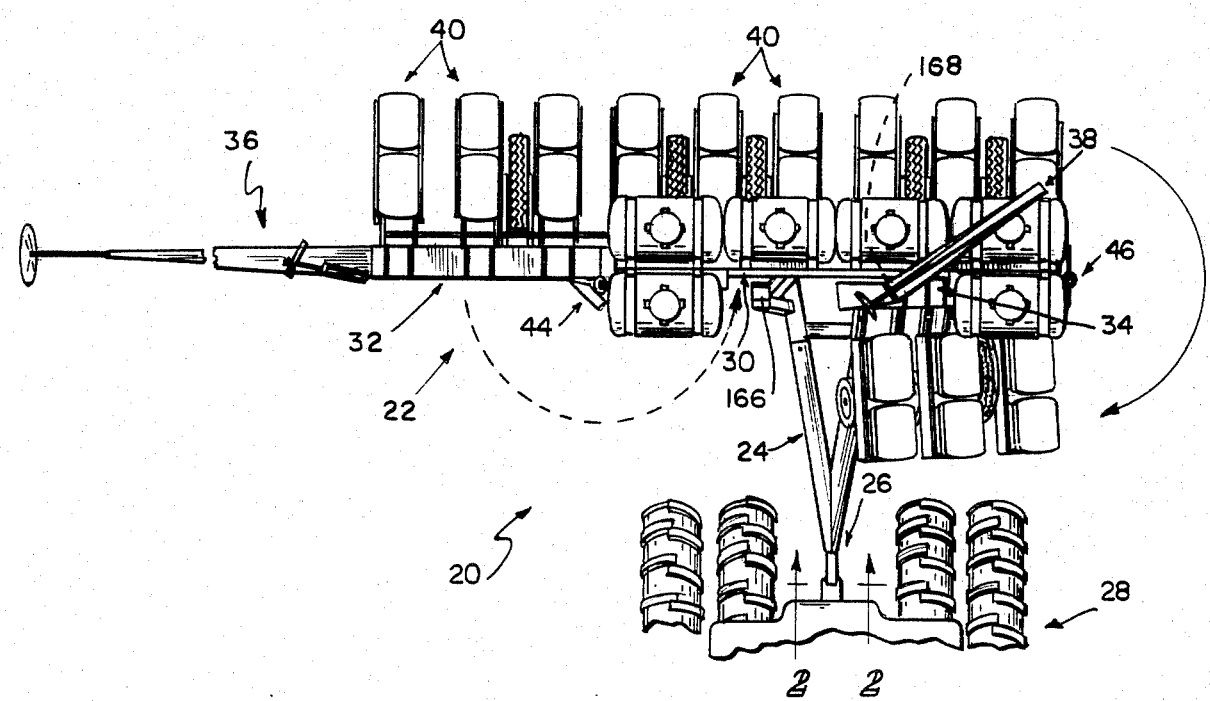
FIG. 1 is a top plan view of a twelve-row "forward and up" folding planter attached to a tractor, shown fragmentarily, with one tool bar end section folded and the other tool bar end section extended from the tool bar center section.
Figure 2:
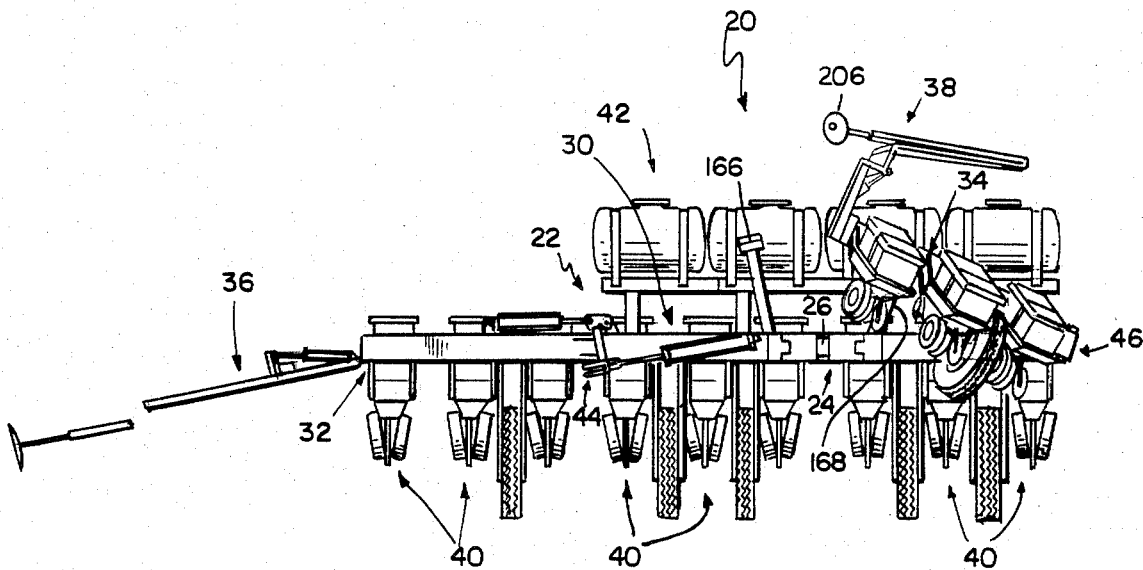
FIG. 2 is a front elevational view, taken generally along section lines 2—2 of FIG. 1.

Turning now to FIGS. 1 and 2, an agricultural implement 20, which is illustratively a twelve-row corn planter, includes a tool bar 22 and a tongue or hitch 24 attached to the tool bar 22 and adapted for coupling at 26 to a tractor 28 to tow the implement 20. As illustrated, and in a typical situation, the tool bar 22 extends generally transverse to the hitch 24 and to the direction in which the implement 20 is towed.

The tool bar 22 is divided into a first, or center, section 30 to which the hitch 24 is attached, and second, or end, sections 32 (on the left as viewed in FIGS. 1 and 2) and 34 (on the right as viewed in FIGS. 1 and 2). In FIGS. 1 and 2, end section 32 is in its unfolded, or use, orientation, and section 34 is in its folded, or non-use, orientation. It is to be understood, however, that both sections can simultaneously be placed in either the use position or the non-use position, depending upon what the operator desires. End section 32 is equipped, at its end remote from center section 30, with a marker 36. Marker 36 is illustrated in the unfolded, or use, orientation. End section 34 is provided, at its end remote from center section 30, with a marker 38, which is illustrated in folded orientation. The construction of markers 36, 38 will be explained hereinafter.

Equally spaced along the tool bar 22 are a number of operating heads 40, such as corn or soybean planter heads, of basically conventional construction. Because of the addition of the "forward and up" folding option, to be described, it was necessary in the implement 20 illustrated in the drawings to move certain fertilizer tanks 42 from their positions on the front of tool bar 22 to positions on top of tool bar 22, and within the width of center section 30.

End sections 32, 34 are movably connected to the center section 30 for movement into use (planting) orientations, illustrated by end section 32 in which the end sections 32, 34 extend generally colinearly with center section 30, generally transverse to the direction in which the implement 20 is towed. The hinges 44, 46 which attach end sections 32, 34, respectively, to opposite ends of center section 30, also permit movement of the end sections 32, 34 into non-use orientations, illustrated by the position of end section 34 in FIGS. 1 and 2, in which the implement 20 can conveniently be towed.

Turning now to FIGS. 3–6, the construction and operation of the hinges 44, 46 will be discussed. Although only hinge 46 connecting end section 34 to center section 30 is illustrated in these drawings, it will be appreciated that hinge 44 is essentially a "mirror image" of hinge 46. Center section 30 and end sections 32, 34 are constructed from steel box beam stock. A closure plate 50 is welded to the end of the box beam stock forming center section 30 adjacent its junction with end section 34. A similar closure plate 52 is welded to the box beam stock forming end section 34 to close it.

Hinge-supporting gussets 56 are welded to the front of end section 34 adjacent closure plate 52. Substantially identical hinge-supporting gussets 58 are welded to the front wall of center section 30 adjacent its upper and lower extremities. Hinge knuckles 60 are welded to the ends of gussets 58 adjacent closure plate 50. Hinge knuckles 62 are welded to gussets 56 adjacent closure plate 52, so that the knuckles 60, 62 cooperate to define a hinge axis 64 along which a hinge pin 66 is inserted to secure end section 34 to center section 30.

A support bracket 70 is welded to the front of center section 30 near the bottom wall thereof at an angle of about 13° to horizontal. This angle is perpendicular to the angle between the hinge axis 64 and a plane perpendicular to the longitudinal extent of center section 30, which is also about 13°. This accounts for the upward movement of end section 34 relative to center section 30 as end section 34 is pivoted about hinge pin 66. Specifically, and as can best be seen by referring to the solid-line and dotted-line positions of end section 34 in FIG. 3, the longitudinal extent of end section 34 makes an angle of about 26° with the longitudinal extent of center section 30 when center section 34 is folded completely (to its position illustrated in FIGS. 1 and 2). The folding mechanism for each end section 32, 34 includes an L-shaped bracket 72 which is pivotally attached at 74 to support bracket 70. At its end remote from pivot 74, bracket 72 is pivotally attached at 76 to an arm 78. At its end remote from pivot 76, arm 78 is pivotally attached to a pivot 80 formed on the bottom of closure plate 52.

A hydraulic motor 82, such as a double-acting piston and cylinder, is pivotally mounted from a mounting bracket 84 provided on center section 30 and from a mounting tab or ear 86 provided on the outside of L-shaped bracket 72. L-shaped bracket 72 and arm 78 lie generally in a plane perpendicular to the hinge axis 64, as does the axis of hydraulic motor 82. Pivots 74, 76, and 80 lie generally parallel to hinge axis 64. It will be appreciated that actuation of hydraulic motor 82 to retract the piston rod 90 into the housing of hydraulic motor 82 (to the position illustrated in FIG. 5) causes end section 34 to pivot about hinge axis 64 to fold end section 34 from its position illustrated in solid lines in FIGS. 3 and 4 to its position illustrated in broken lines in FIG. 3 and in solid lines in FIG. 5.

Figure 3:
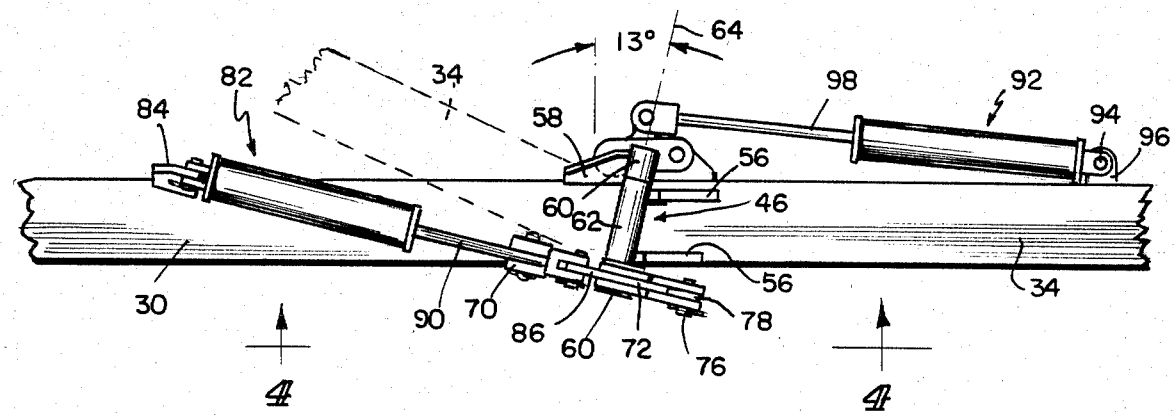
FIG. 3 is an enlarged front elevational view of a detail of FIG. 2.
Figure 4:
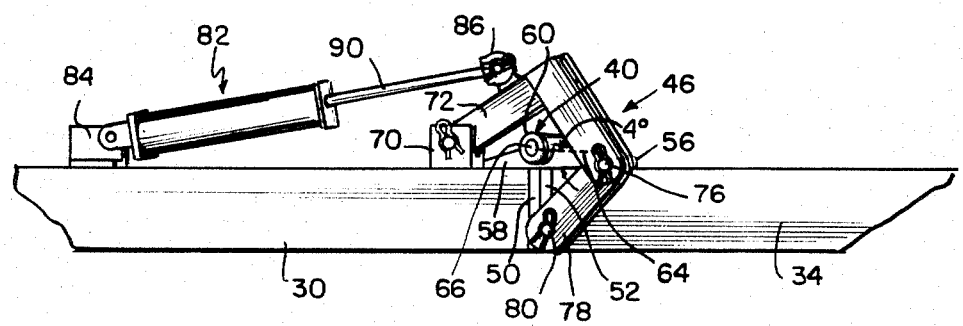
FIG. 4 is a bottom plan view of the detail of FIG. 3, taken generally along sections lines 4—4 of FIG. 3.
Figure 5:
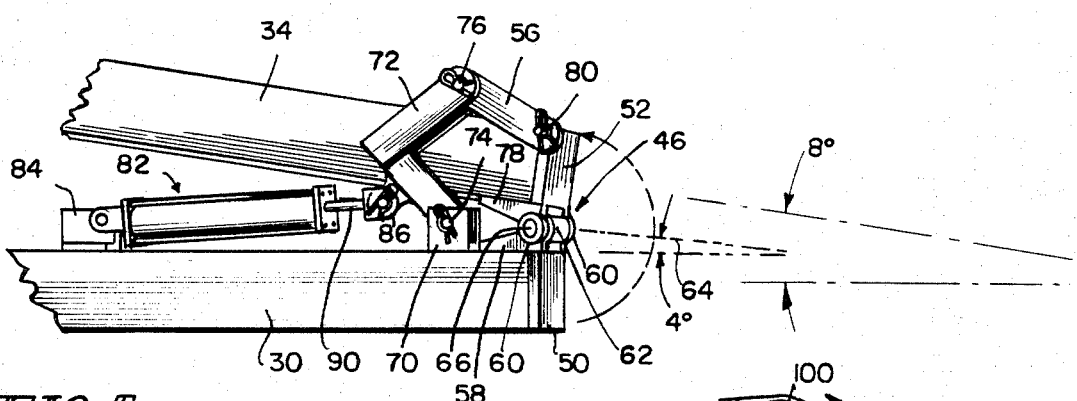
FIG. 5 is an enlarged view of the detail of FIGS. 3 and 4, taken generally from the same direction as FIG. 4, but showing the planter end section in folded orientation.
Figure 6:
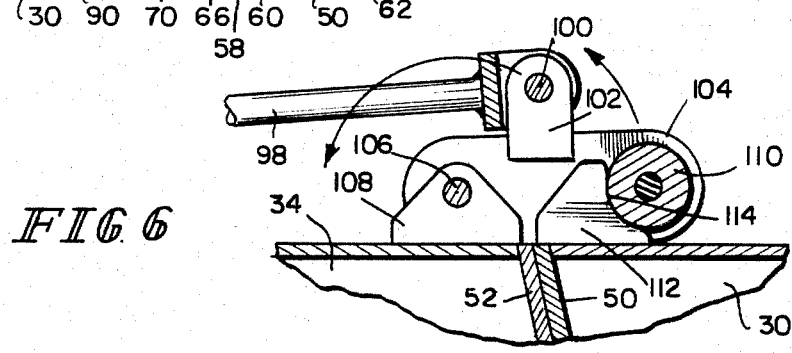
FIG. 6 is an enlarged sectional elevation of a portion of the detail illustrated in FIG. 3.

To minimize stress on the hydraulic motor 82 when the end section 34 is in the use orientation, a hydraulic locking system is provided. This hydraulic locking system is best illustrated in FIGS. 3 and 6. The system includes a hydraulic motor 92 of the double-acting piston and cylinder type, the cylinder of which is pivotally attached at 94 to a mounting bracket 96 welded to the top of end section 34. The piston rod 98 of hydraulic motor 92 is pivotally attached at 100 to a tab or ear 102 formed on a locking bracket 104 which itself is pivotally mounted at 106 to a mounting bracket 108 welded to the top of end section 34. Locking bracket 104 is provided at its outer end with a roller 110. A complementary locking bracket 112 is welded to the top of center section 30 adjacent closure plate 50, and is provided with a generally part circular cut-out 114 on its edge which faces away from end section 34 and toward the tongue 24.

Hydraulic motors 82 and 92 function concurrently in a manner which can best be understood by reference to FIG. 10, a simplified hydraulic circuit diagram of the portion of the hydraulic circuit of implement 20 which operates these hydraulic motors. In FIG. 10, a hydraulic pump 120 provides hydraulic fluid under pressure from a reservoir 122 through a line 124 and a two-way valve 126. Valve 126 has two positions. In one of these positions (illustrated), hydraulic fluid flows through line 124 and valve 126 to a hydraulic line 128 which feeds the piston end 130 of hydraulic cylinder 82. Hydraulic fluid in line 128 also supplies the piston end 132 of hydraulic cylinder 92 through an adjustable flow restrictor 134 which permits the piston end 130 of hydraulic cylinder 82 to be filled at a slightly faster rate than the piston end 132 of hydraulic cylinder 92. In this manner, it is assured that, as hydraulic motor 82 moves end section 34 from its non-use position (illustrated in broken lines in FIG. 3) to its use position (illustrated in solid lines in FIG. 3), the end section 34 reaches its use position before locking bracket 104 reaches its position illustrated in FIG. 6. Therefore, the end section 34 is completely unfolded to its use position before roller 110 engages in locking orientation the part circular cut-out 114 of bracket 112. Since relatively low friction is encountered by roller 110 as it moves out of engagement with cut-out 114, no flow restrictor is provided in the line 140 which extends from two-way valve 126 to the piston ends 142, 144, respectively, of fluid motors 82, 92. That is, when valve 126 is in its other position, in which hydraulic fluid flows from line 124 through the valve 126 to line 140, the rod ends 142, 144 of hydraulic motors 82, 92 fill at substantially the same rates causing substantially simultaneous unlocking and folding of end section 34 from its use position illustrated in solid lines in FIGS. 3 and 4 to its non-use position illustrated in broken lines in FIG. 3 and in solid lines in FIG. 5.

The return line 150 from the piston ends 130, 132, respectively, of hydraulic motors 82, 92 is coupled to one side of a two-way valve 152 which operates in conjunction with valve 126. Similarly, the return line 154 from the rod ends 142, 144, respectively, of fluid motors 82, 92 is coupled to the other side of two-way valve 152, such that, when valve 126 is in its position illustrated in FIG. 10, and fluid is flowing from line 124 to line 128, valve 152 is in its position illustrated in FIG. 10 and fluid is flowing from line 154 to a return line 160 to reservoir 122. Conversely, when valve 126 is in its position permitting fluid to flow from line 124 to line 140, valve 152 is in its position draining line 150 back through line 160 to reservoir 122.

As can best be appreciated by referring to FIG. 2, when the end sections 32, 34 are folded to their non-use orienations, their ends lie vertically generally above the adjacent portion of the center section 30, and specifically, markers 36, 38 lie vertically directly above the center of tongue 24, with marker 36 on the left-hand side of the tongue 24 center and marker 38 on the right-hand side of the tongue 24 center as viewed in FIGS. 1 and 2. This folding arrangement provides a much more compact and vertically shorter folded implement than the solely vertical fold or solely horizontal fold implements illustrated and described in *Drawn and Integral Planters*. In addition, to ease some of the stress on the hinges 44, 46, rest brackets 166, 168 extend upwardly and outwardly from the sides of tongue 24 to permit end sections 32, 34, respectively, to slide onto them and rest on them when these end sections 32, 34 are in non-use orientations. Thus, the "forward and up" folding configuration of the present invention in which the ends of the end sections 32, 34 almost contact one another directly above the center line of the tongue 24 provides the most compact folded arrangement for an implement such as implement 20. This arrangement is achieved primarily through the hinge axis 64 which is angled from the vertical in a plane parallel to the longitudinal extent of the tool bar 22 center section 30, since this particular arrangement, including an angle generally between 5° and 15° lifts the end sections 32, 34 above the tongue 24 and places them as close together as they can be placed over the tongue 24 without interferring with one another. Additionally, the added height available to end sections 32, 34 during folding helps these sections clear the rear parts, including the tires, of tractor 28.

To assist in the folding and unfolding of end sections 32, 34, an additional structural feature is incorporated into hinges 44, 46. Particularly with reference to FIGS. 4 and 5, it will be noted that the hinge axis 64 is angled from the vertical, not only in a plane parallel to the longitudinal extent of the tool bar 22, but is also angled from the vertical in a plane perpendicular to the longitudinal extent of the tool bar. Specifically, the lower end of each hinge 44, 46 lies outward from the front wall of center section 30 slightly farther than the top of each hinge 44, 46. This is achieved by proper configuration of the sizes and shapes of the gussets 56, 58. This angling outward of the bottom of the hinge 44, 46 with respect to the tool bar 22 is provided so that the marker 36, 38 end of each end section 32, 34, during movement between its non-use and use orientations, moves more easily. This aids in the deployment of the end sections to use orientations when then implement 20 is not on perfectly level ground.

Turning now to another aspect of the disclosed embodiment, with reference to FIG. 2, it will be noted that the marker 36, 38 ends of end sections 32, 34 rise vertically during their folding a considerable distance above the level of center section 30. Since the markers 36, 38, even in their stored or non-use orientations, are relatively tall, the folding of the end sections 32, 34 with conventional markers would result in a folded implement 20 which was relatively high and might find it difficult to pass certain vertical obstructions, e.g., low vertical clearance overpasses. As a result, a collapsible marker boom configuration has been incorporated into the implement 20 of the present invention.

Referring now particularly to FIGS. 7-9, the mast 170 of marker 38 is sectioned along a generally horizontal plane 172 to provide a lower mast section 174 and an upper mast section 176. A plate 178 is welded to the top of lower mast section 174, and a plate 180 is welded to the bottom of upper mast section 176. Plates 178, 180 are of generally the same configuration, best illustrated in FIG. 9. Plate 178 is provided with hinge knuckle 182 along its interior edge. Plate 180 is provided with cooperating hinge knuckles 184 along its interior edge. A hinge pin 188 pivotally connects the lower mast section 174 and upper mast section 176 for movement between a folded, non-use orientation, illustrated in FIG. 7, and an extended use orientation illustrated in FIG. 8.

It will be recognized that, although FIG. 8 illustrates the mast 170 as extending vertically in a use orientation, in fact, the mast 170 will extend generally horizontally in its use orientation. This results from pivotal movement of the entire mast 170 assembly about a hinge 190 which connects the base of lower mast section 174 to the outer end of tool bar 22 end section 34. Such pivotal motion results in dropping of the mast assembly 170 in the direction indicated by arrow 192 in FIG. 7. This dropping of the mast is controlled by a fluid motor (not shown) mounted within the end of tool bar 22 end section 34.

As is apparent from the drawings, the axis of hinge pin 188 makes an angle of approximately 30° with the generally planar upper and lower mast sections 174, 176. This causes upper mast section 176 to fold somewhat forward when the end section 34 is in its use orientation. This means that, when the end section 34 is in its non-use orientation illustrated in FIG. 1, upper mast section 176 points somewhat outward and toward the rear of implement 20.

To achieve folding and deployment of upper mast section 176 relative to lower mast section 174, a fluid motor 192 of the double-acting piston and cylinder type is employed. The piston end 194 of motor 192 is connected by means of a bracket 196 and a pivot 198 to lower mast section 174. The rod 200 of fluid motor 192 is coupled by means of a long arm bracket 202 and a pivot 204 to upper mast section 176 above and adjacent plate 180. Protraction of rod 200 from fluid motor 192 pivots upper mast section 176 about hinge pin 188 to raise mast section 176 to its position illustrated in FIG. 8. Subsequently, the fluid motor in end section 34 is actuated to pivot the entire mast assembly 170 about hinge 190 toward a generally horizontal use orientation. This pivotal movement is transmitted to the boom (not shown) which carries the marker disk 206 to deploy the marker disk. If marker 38 is not to be used, it can be returned to its non-use orientation illustrated in FIG. 7 by reversing the direction of flow of hydraulic fluid into motor 192, forcing rod 200 back to its position illustrated in FIG. 7.

What is claimed is:

1. In an agricultural implement including a tool bar and a tongue, means for mounting the tongue from the tool bar to tow the implement with the tool bar extending generally transverse to the direction in which it is towed, one or more operating heads, and means for mounting the operating heads from the tool bar in functional positions, the tool bar comprising a first tool bar section and a second tool bar section and means for movably connecting the first and second tool bar sections so that they are movable into a use orientation in which they extend generally colinearly and into a non-use orientation in which the implement can conveniently be towed, the improvement wherein the means for connecting the first and second sections together includes a hinge which includes a hinge axis which is angled from the vertical in a plane perpendicular to the longitudinal extent of the tool bar, the angle which the axis makes with the vertical in a plane perpendicular to the longitudinal extent of the tool bar being greater than zero degrees and less than about ten degrees, the hinge axis also being angled from the vertical in a plane parallel to the longitudinal extent of the tool bar, the angle which the axis makes with the vertical in a plane parallel to the longitudinal extent of the tool bar being between about five degrees and about fifteen degrees, the hinge being positioned to permit the tool bar second section to fold upwardly from the use orientation into a position in which it lies between a towing vehicles and the first section in the non-use orientation, and a locking means for locking the first section with respect to the second section, the locking means comprising a fluid motor and a first bracket disposed on the second section, the first bracket including a roller and means for pivotally coupling the first bracket to the fluid motor, and a second bracket disposed on the first section, the second bracket including means for engagement by the roller, the roller-engaging means being engageable with the roller of the first bracket by actuation of the fluid motor to move the first bracket to a locking position.

2. The improvement of claim 1 wherein the means for movably connecting the first and second sections together further includes a second fluid motor for moving the first and second sections selectively between the use orientation and the non-use orientation and means for coupling the second fluid motor to the first and second sections.

3. The improvement of claim 2 and further comprising a support, and means for mounting the support on the implement such that the second section in its non-use orientation rests upon the support.

4. The improvement of claim 3 and further including a mast section, means for movably coupling the mast section to the second section so that the mast section is movable into a use orientation in which it extends generally colinearly with the first and second sections when they are in their use orientations and into a non-use orientation in which the implement can be towed.

5. The improvement of claim 4 wherein the means for movably coupling the mast section to the second section comprises a hinge means having a portion disposed on the second section and a portion disposed on the mast section.

* * * * *